US006648572B2

(12) United States Patent
Piazza

(10) Patent No.: US 6,648,572 B2
(45) Date of Patent: Nov. 18, 2003

(54) MAGAZINE WITH REMOVABLE INCLINED FRAMES FOR STORING AND TRANSFERRING PANEL-LIKE PRODUCTS

(76) Inventor: Antonio Piazza, Via Tuzzi, 87, 36015 Schio (IT)

(*) Notice: Subject to any disclaimer, the term of this patent is extended or adjusted under 35 U.S.C. 154(b) by 0 days.

(21) Appl. No.: 09/849,264

(22) Filed: May 7, 2001

(65) Prior Publication Data

US 2002/0005332 A1 Jan. 17, 2002

(30) Foreign Application Priority Data

May 12, 2000 (IT) .......................................... PD00A0119

(51) Int. Cl.$^7$ ................................................. B60P 7/08
(52) U.S. Cl. .................. 414/276; 414/267; 414/331.06; 414/277; 414/279; 211/162; 211/41.1; 410/32; 410/43; 410/66; 410/67
(58) Field of Search ............................... 410/32, 43, 46, 410/66, 67; 414/267, 331.06, 286, 277, 276, 279; 211/1.51, 1.57, 72, 162, 41.1, 41.14, 41.15; 312/183, 184

(56) References Cited

U.S. PATENT DOCUMENTS

| 482,332 A | * | 9/1892 | Bemis |
| 5,007,351 A | * | 4/1991 | Muth |
| 5,375,959 A | * | 12/1994 | Trento ......................... 414/277 |
| 5,378,093 A | * | 1/1995 | Schroeder .................... 410/32 |
| 5,505,574 A | * | 4/1996 | Piazza ......................... 414/267 |
| 5,542,805 A | * | 8/1996 | Lisec ........................... 414/280 |

* cited by examiner

Primary Examiner—Stephen T. Gordon
(74) Attorney, Agent, or Firm—Guido Modiano; Albert Josif; Daniel O'Byrne

(57) ABSTRACT

A magazine with removable inclined frames comprising a plurality of inclined frames arranged side by side in a parking area, each frame having, at its base, a carriage-like structure which carries the inclined frame so that it is mounted on, and slideable in, a pair of rails dedicated thereto in the parking area. A transfer structure is provided to the side of the parking area and comprises a shuttle to receive one or more carriages and to convey the carriage at right angles to the plane of arrangement of the frame. A motor is provided for producing the translational motion of the carriages on the shuttle, and additional motors are provided for producing the translational motion of the shuttle parallel to the parking area of the set of frames.

11 Claims, 7 Drawing Sheets

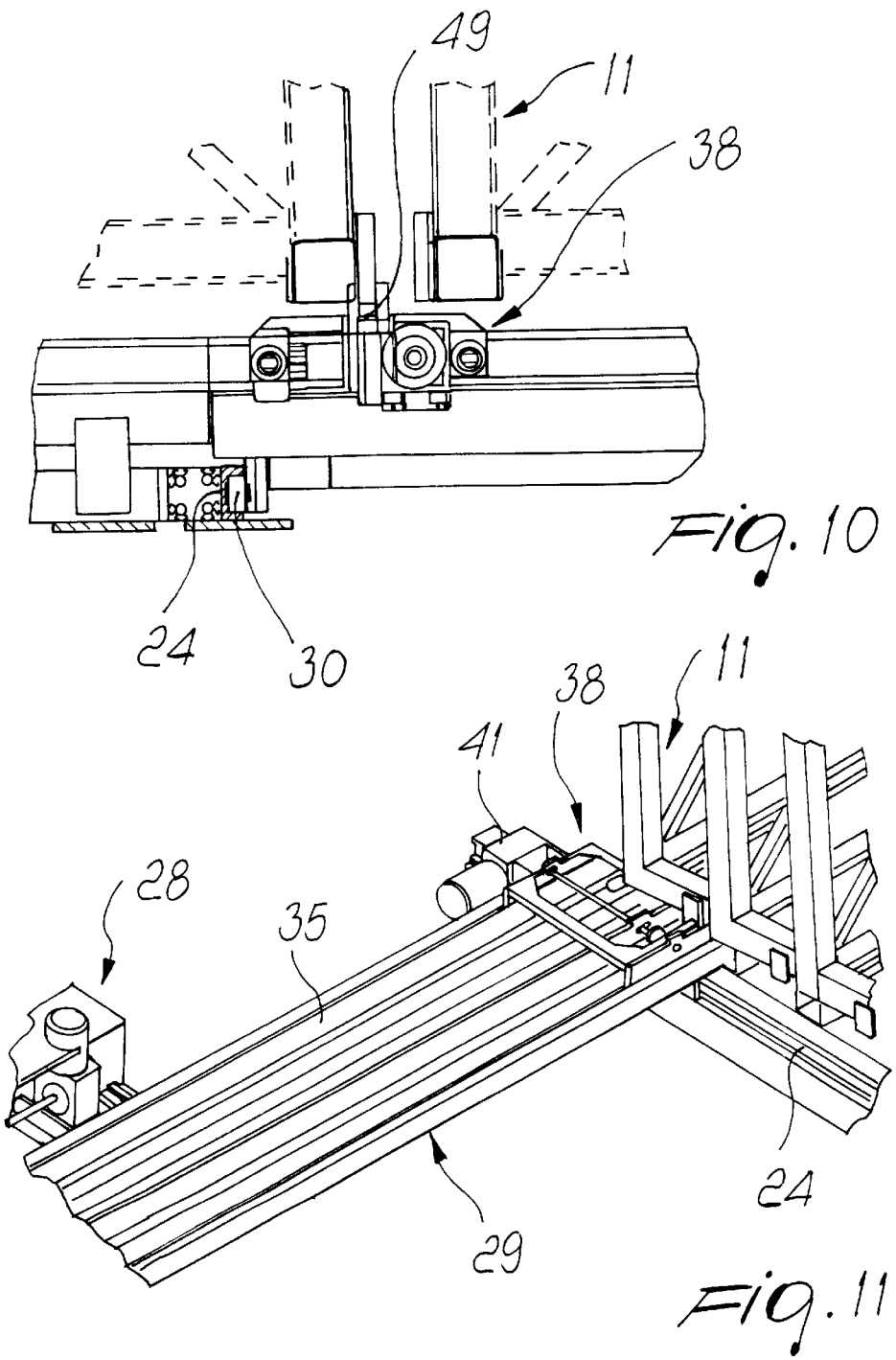

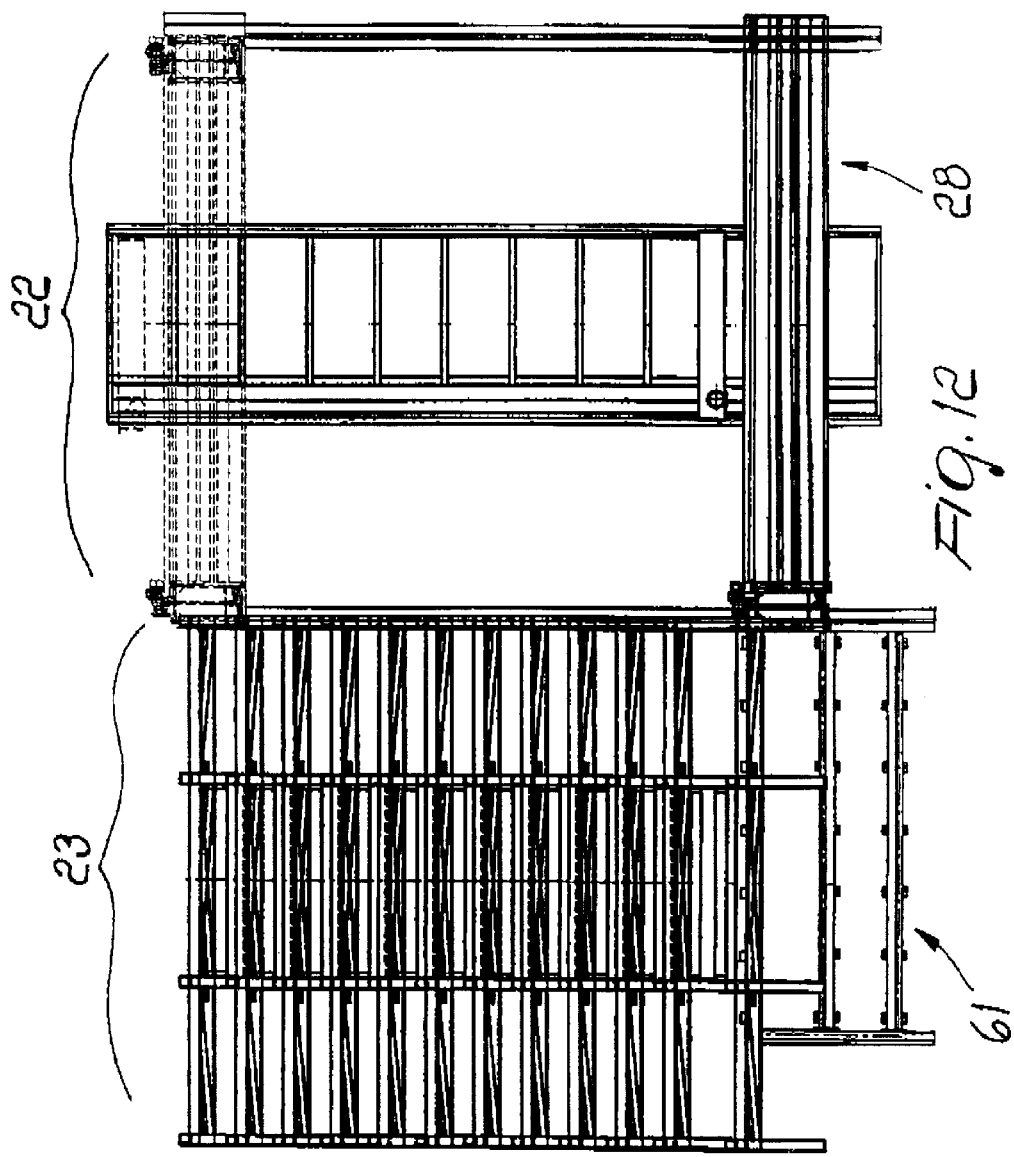

MAGAZINE WITH REMOVABLE INCLINED FRAMES FOR STORING AND TRANSFERRING PANEL-LIKE PRODUCTS

BACKGROUND OF THE INVENTION

The present invention relates to a magazine with inclined frames for storing panel-like products such as glass sheets or marble slabs.

The present invention also relates to a magazine in which the frames can be removed from a parking area and transferred to a point for easy transfer, which can also be a point where a treatment of the sheets or slabs begins or where a line for the treatment of the sheets or slabs begins.

Various types of magazine for storing plate-like products are known.

Usually, these magazines have a plurality of frames which are all inclined in the same manner and are arranged in a storage area, while various manners are provided for accessing them for both loading and unloading said sheets or slabs arranged therein.

SUMMARY OF THE INVENTION

The aim of the present invention is to provide a magazine which optimizes the available space.

Within this aim, an object of the present invention is to provide a magazine with automated loading and unloading and particularly for feeding sheet or slab treatment lines.

Another object is to provide a magazine in which it is possible to choose easily the type of panel-like product among those stored.

Another object is to make the magazine fully independent of the structures of the space in which it is placed.

Another object is to provide a magazine which can be easily combined with lines for treating the contained sheets or slabs.

This aim and these and other objects which will become better apparent hereinafter are achieved by a magazine with inclined frames for storing and transferring panel-like products, comprising a plurality of frames which are all inclined in the same manner and are arranged side by side in a parking area, characterized in that each one of said frames has, at its base, a carriage-like structure, each of said carriage-like structures being slideable in a pair of rails in the parking area which allow a horizontal movement of the carriage parallel to a plane of arrangement of said frame, a transfer structure being provided to a side of the set of frames, said transfer structure being constituted by a shuttle provided with a plurality of rails which allow to receive one or more carriages, related to one or more frames, and to convey said carriage at right angles to the plane of arrangement of said frame, motorized means being adapted to produce a translational motion of the frame on said shuttle, motorized means being also provided for producing a translational motion of said shuttle, the rails of the parking area, the rails of the shuttle and those on which the shuttle moves being [-shaped or I-shaped so as to contain the wheels that move therein, in order to prevent the frames from tipping.

BRIEF DESCRIPTION OF THE DRAWINGS

Further characteristics and advantages of the invention will become better apparent from the following detailed description of a preferred embodiment thereof, given by way of non-limitative example and illustrated in the accompanying drawings, wherein:

FIG. 10 is a detailed view of the point where the frames are arranged side by side in the storage area and in the transfer area where engagement of the frame occurs;

FIG. 11 is a partial perspective view of the device for the translational motion of the frame mounted on the shuttle in the step for engaging a frame;

FIG. 12 is a plan view of a magazine which has an auxiliary temporary storage area for feeding a production line.

DESCRIPTION OF THE PREFERRED EMBODIMENTS

Figure 1:
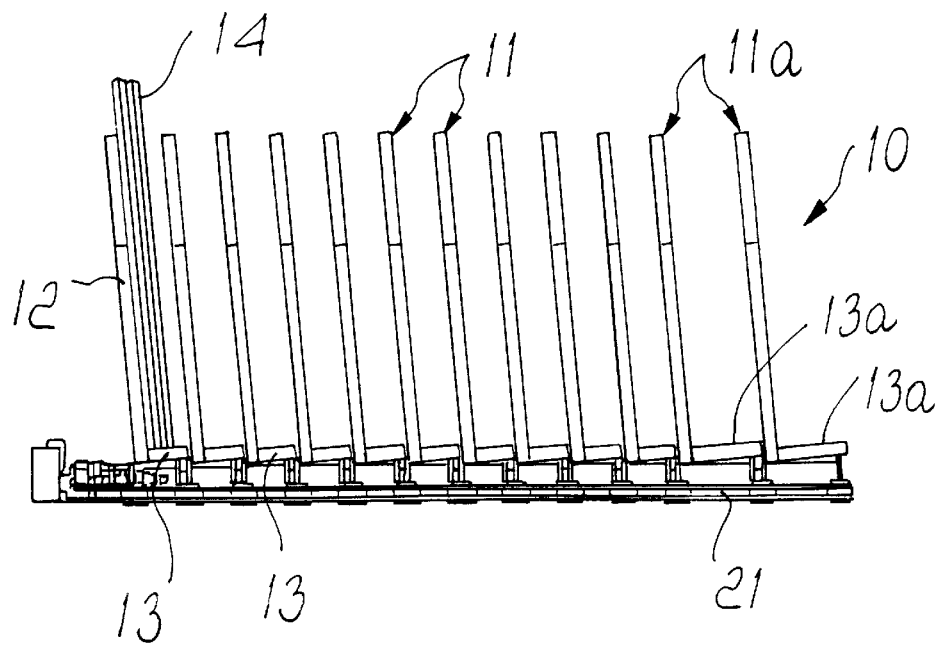
FIG. 1 is a side view of the set of frames of the magazine according to the present invention.
Figure 2:
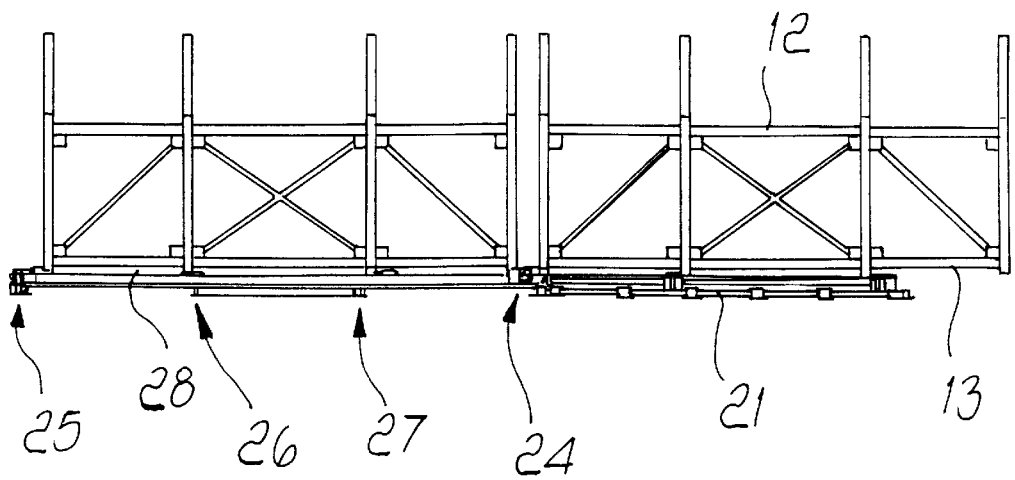
FIG. 2 is a front view which shows, on the right, the storage or parking area and, on the left, the transfer and reception area.

With reference to the figures, in FIG. 1 the magazine is generally designated by the reference numeral 10 and as shown is composed of a plurality of frames 11 provided with a side wall 12 and with a resting base 13 for packs of sheets or slabs, one of which is designated by the reference numeral 14.

The frames can also be of the type 11a, which have a wider base 13a than the others.

The width of the base is chosen according to the packs of sheets or slabs to be stored in the frame.

Figure 5:
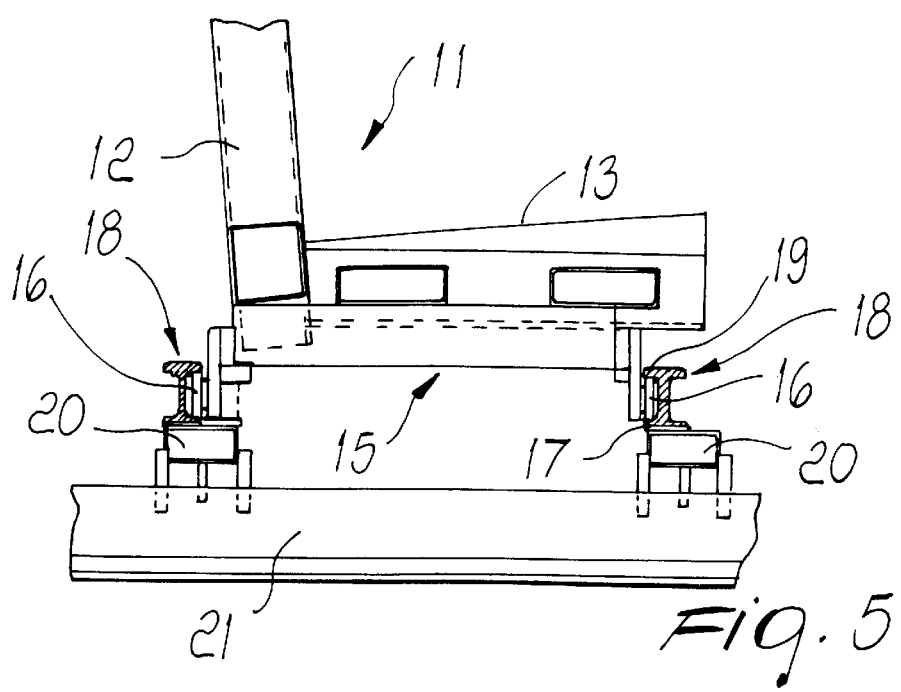
FIG. 5 is a view of the shape of the base of the frames with the tipping-prevention means.

Each frame has, at its base, a carriage-like structure which is shown more clearly in FIG. 5, where it is generally designated by the reference numeral 15.

Such carriage-like structure has a plurality of wheels 16 which move by resting on the lower wing 17 of longitudinal I-shaped rails 18.

The wheels 16 make contact from below with the upper wing 19 of the rail 18 and are thus contained, making it impossible for the frame 11 to tip even if the thrust of the load is not centered.

The rails 18 are rigidly coupled to transverse longitudinal members 20 which are in turn rigidly coupled to base beams 21 which are rigidly coupled to the ground.

Figure 3:
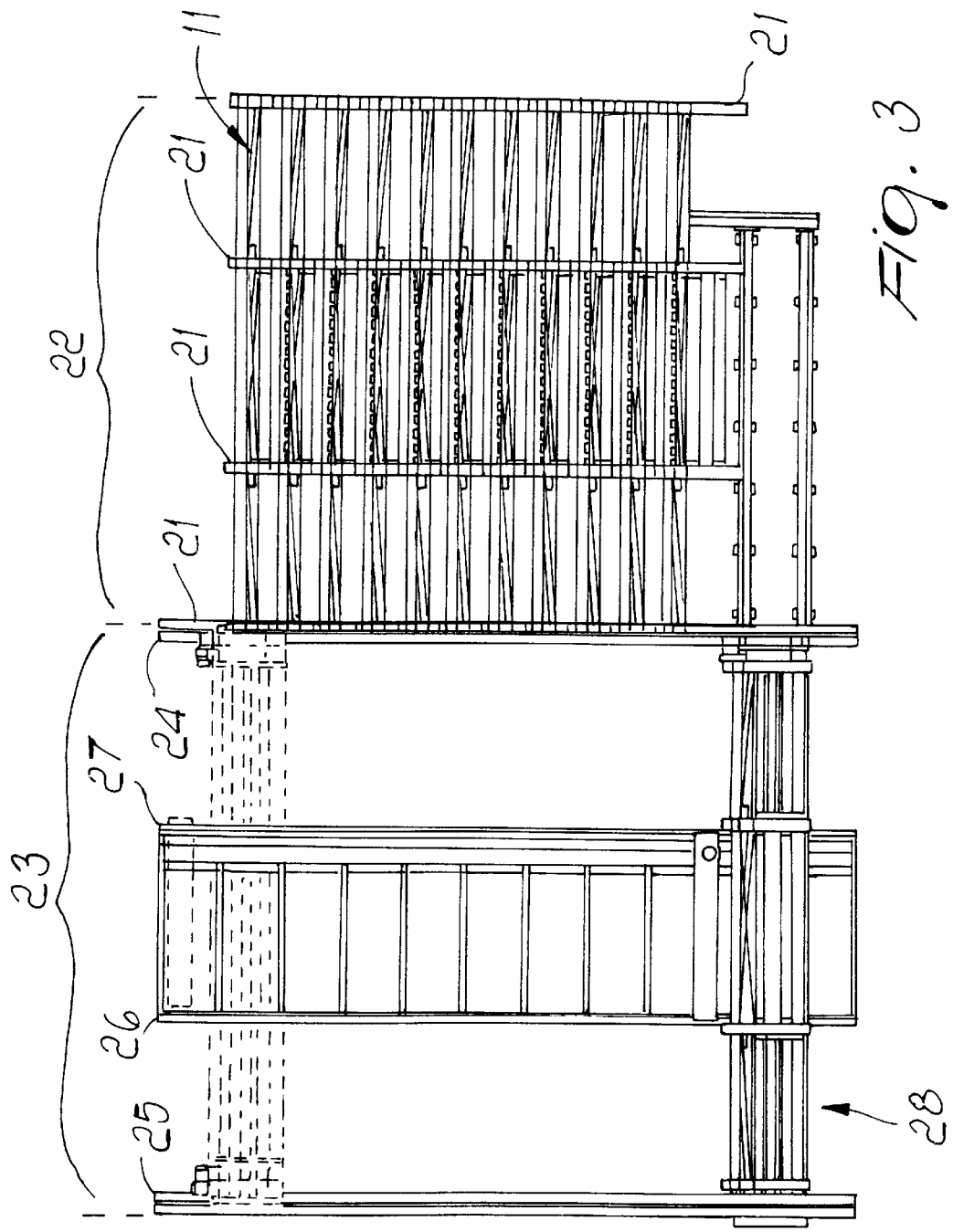
FIG. 3 is a plan view of the entire magazine and of the transfer area.
Figure 4:
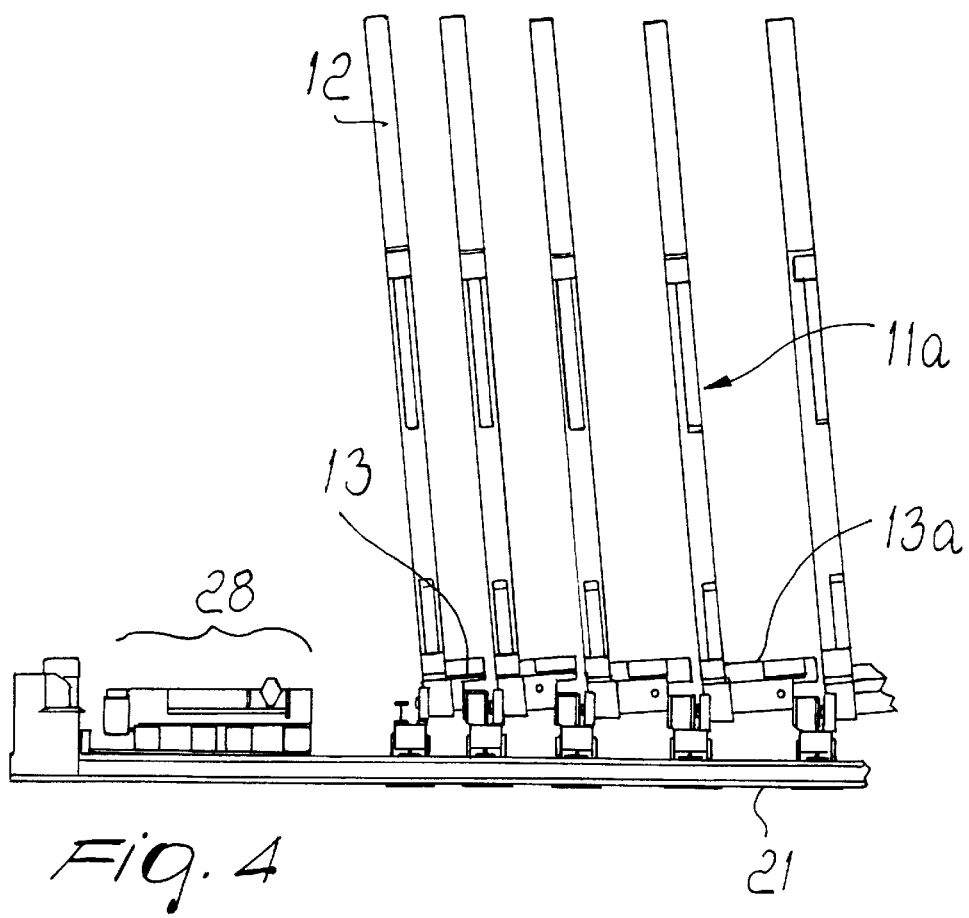
FIG. 4 is a more detailed side view of the frames and of the shuttle for translational motion.

The region where the set of frames is located, termed parking area, is designated by the reference numeral 22 in FIG. 3 and is flanked by a transfer area, designated by the reference numeral 23, in which there are respectively two outer rails 24 and 25 and two intermediate rails 26 and 27 on which a shuttle 28 moves, the motion of said shuttle being perpendicular to the arrangement of the frames 11.

Figure 6:
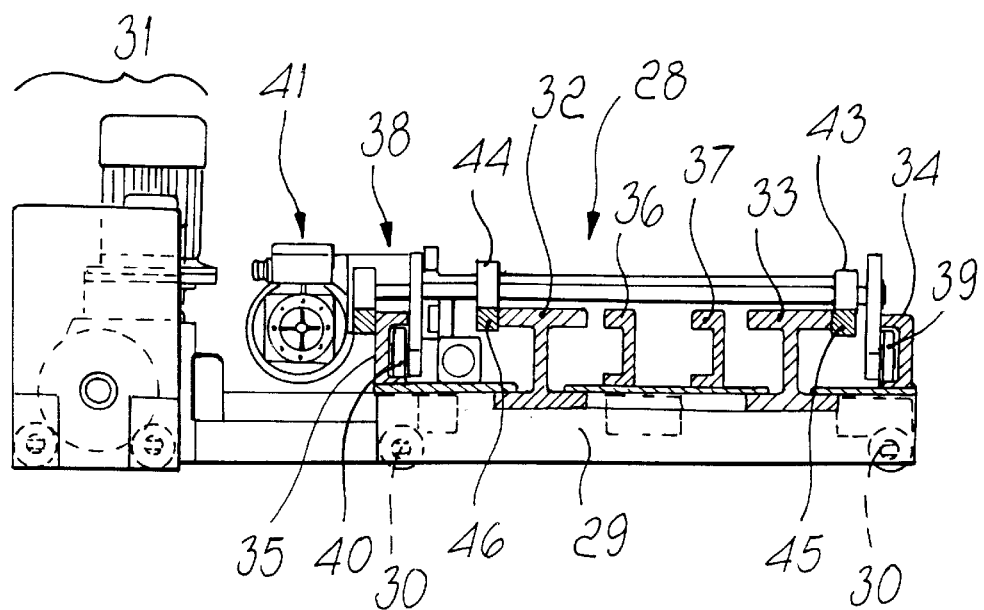
FIG. 6 is a view of the shuttle for carrying a chosen frame and of the motorized device for producing the translational motion of the frame on the shuttle.
Figure 7:
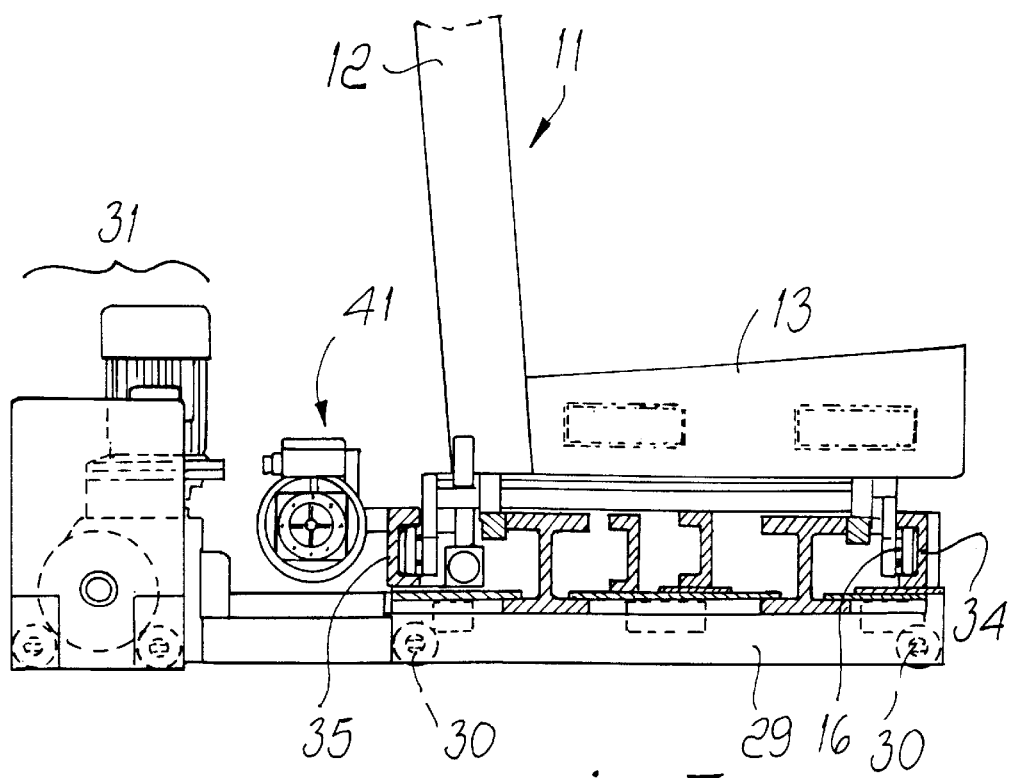
FIG. 7 is a view of the shuttle of FIG. 6, with a frame mounted thereon.
Figure 8:
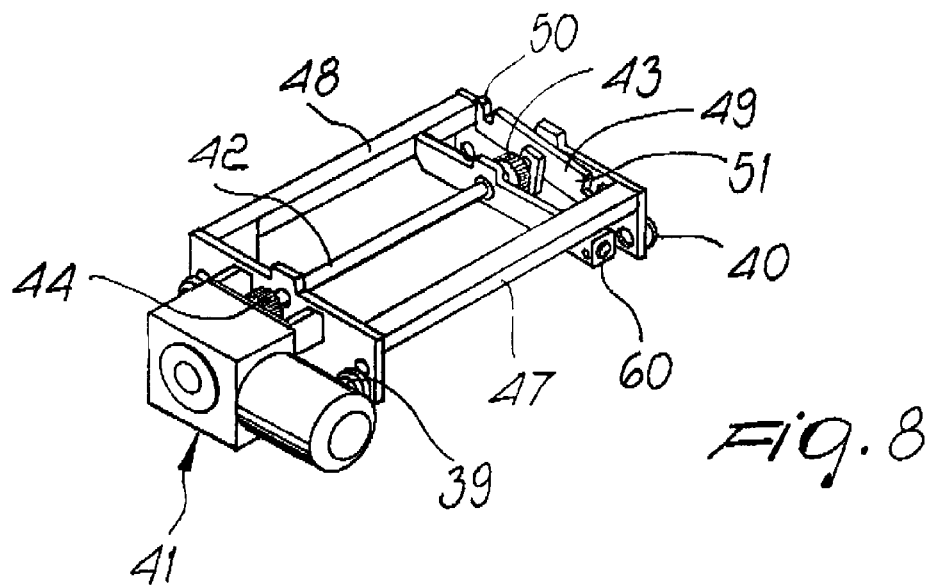
FIG. 8 is a perspective view of the device for the translational motion of the frame on the shuttle.
Figure 9:
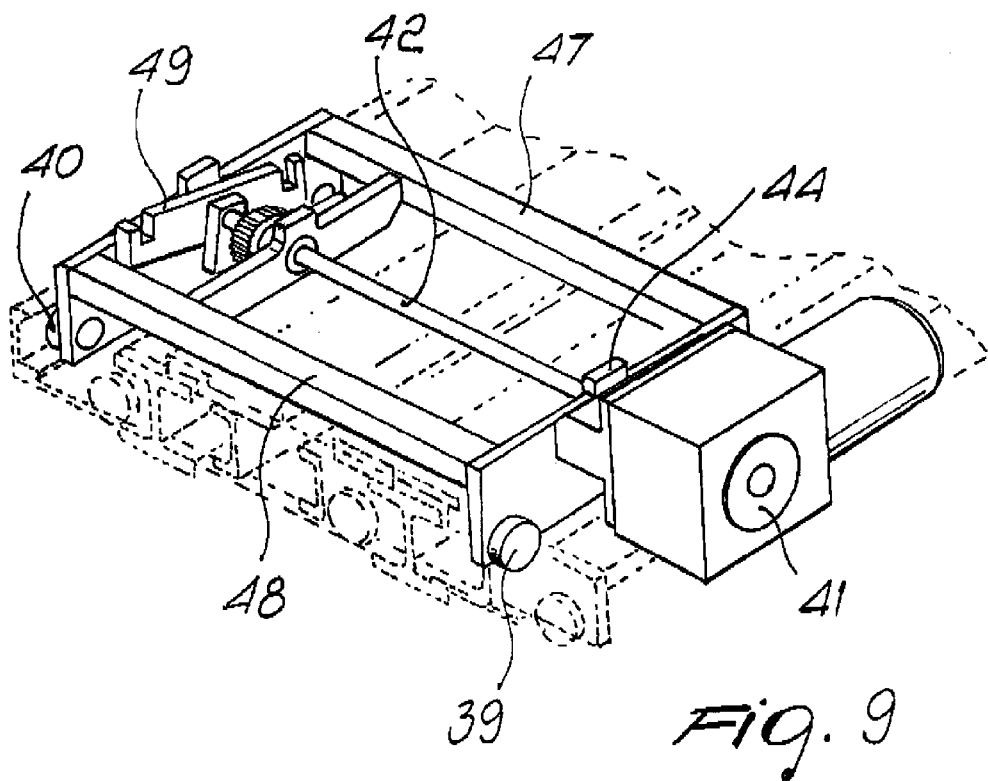
FIG. 9 is a perspective view of the device for the translational motion of the frame, mounted on the shuttle.

The shuttle 28, as shown more clearly in FIGS. 6 and 7 and onward, is composed of a carriage 29 which is provided with wheels 30 and is motorized with a gearmotor 31 which allows its movement on the rails 24, 25, 26 and 27.

Structurally, the carriage 29 is composed of at least two strong I-shaped profiles 32 and 33 and by a plurality of [-shaped profiles, of which the outermost two are designated by the reference numerals 34 and 35 and the intermediate two are designated by the reference numerals 36 and 37.

As clearly shown in FIG. 7, when the shuttle is placed in front of the rails that support one or more frames, the frames can be transferred onto the shuffle, since the wheels 16 slide within the [-shaped profiles 34 and 35.

This occurs when the frame has a base width which affects the two outer rails.

If the frame were narrower, the wheel on the side 12 would still affect the profile 35, while the other wheel would be located within one of the profiles 36 or 37.

The fact that the wheels 16 are in any case located within a [-shaped profile means that there is absolute certainty that the frame will not tip.

In order to move the frame, generally designated by the reference numeral 11, onto the shuttle 28, there is a motorized translational motion means 38 which is provided with wheels, of which FIG. 6 shows the ones designated by the reference numerals 39 and 40, which slide within the outer [-shaped profiles 34 and 35.

The translational motion means is provided with a motor with a reduction unit 41 which drives a shaft 42 which has two toothed pinions 43 and 44 which mesh, for transfer, on two longitudinal racks 45 and 46.

The structure that gives the translational motion means the shape of a carriage is completed by a frame composed of longitudinal members 47 and 48.

The translational motion means 38 also has an anchor 49 provided with end engagement elements 50 and 51, with which it engages the frame to be transferred and, in its translational motion, transfers it onto the shuttle or returns it to the parking position inside the area 22.

The anchor 49 is pivoted on the axis 42 and is actuated by a piston 60.

The structure and the operation of the magazine can be easily deduced from what has been described and illustrated; in particular, it is noted that the magazine is structured so that it is possible first of all to store panel-like products on frames even if they are not all identical but wider or narrower in their useful space according to the type of material.

Moreover, each frame can be extracted and moved into a front region, where it can directly serve a production line or can be easily loaded or unloaded without having to use particular handling units which take into account the limited space available between one frame and the next in the storage area.

The assembly can be fully automated and all the operations occur in maximum safety.

FIG. 12 illustrates a different embodiment in which there is an area 61 in which it is possible to temporarily place a frame or a plurality of frames, according to its extension, white the shuttle returns to pick up or move an additional frame.

This allows to reduce considerably the time required, for example, for loading or unloading the frames, since in the temporary standby area 61 one can work without affecting the transfer units of the magazine.

From what has been described and illustrated, it is thus evident that the intended aim and objects have all been achieved and that a magazine with frames for sheets or slabs has been provided which has efficient, cheap and rapid means for transferring the frames that support the sheets or slabs.

The materials and the dimensions may of course be any according to requirements.

The disclosures in Italian Patent Application No. PD2000A000119 from which this application claims priority are incorporated herein by reference.

What is claimed is:

1. A magazine for storing and transferring panel-like products, comprising:
   a plurality of frames which are inclined and arranged side by side in a parking area, carriage structures arranged at a base of each of said frames,
   each carriage structure comprising wheels a plurality of first rails provided in the parking area, means for slideably mounting said carriage structures on said first rails, so as to allow a horizontal movement of each carriage structure parallel to a plane of arrangement of said frames, a transfer structure provided at a side of said plurality of frames, a shuttle comprised by said transfer structure a plurality of second rails which allow to receive at least one of said carriage structures and to convey said at least one of said carriage structures at right angles to the plane of arrangement of the respective frames,
   first motorized means for producing a translational motion of the frames on said shuttle,
   third rails rigidly coupled to the ground;
   second motorized means for producing a translational motion of said shuffle on said third rails which are rigidly coupled to the ground, the first rails of the parking area, the second rails and the third rails on which the shuttle moves being [-shaped or I-shaped so as to contain the wheels of the carriage structures that move therein and prevent the frames from tipping.

2. The magazine according to claim 1, wherein said first rails are provided with [- or I-shaped profiles having upper and lower wings between which the wheels slide without being able to escape from a seat defined by said upper and lower wings.

3. The magazine according to claim 2, wherein the wheels of the carriage structures are contained within the [- or I-shaped profiles.

4. The magazine according to claim 1, wherein said shuffle is constituted by a strong frame which is provided with wheels and said second motorized means, said wheels sliding in said third rails which are fixed to the ground and are arranged perpendicularly to the frames in the parking area.

5. The magazine according to claim 4, wherein the second rails can be aligned with the first rails in order to extract one of said carriage structures from the parking area.

6. The magazine according to claim 5, wherein said second rails are arranged at such distances that they can in any case receive the wheels of the carriage structure arranged at the base of any one of said frames, the different widths of said carriage structures notwithstanding.

7. The magazine according to claim 1, wherein said first motorized means for producing the translational motion of a chosen frame onto the shuttle comprise a motorized carriage which performs a translational motion on the second rails and is provided with an anchor for engaging a head of a chosen frame, towing said frame onto the shuffle or pushing said frame off the shuffle and returning it to the parking area.

8. The magazine according to claim 7, wherein said anchor is pivoted to a shaft of said first motorized means and is actuated by a piston which engages or disengages said anchor from the head of the chosen frame.

9. The magazine according to claim 7, wherein said first motorized means adapted to produce the translational motion of the frames comprises a motor equipped with a reduction unit which actuates a shaft on which at least one pinion is keyed, said pinion meshing on at least one rack which is rigidly coupled to said shuttle and is arranged parallel to said second rails.

10. The magazine according to claim 5, wherein said plurality of second rails is arranged so that there is always a pair of said second rails at a distance which is equal to a spacing of the first rails from which a chosen carriage structure is transferred.

11. The magazine according to claim 1, comprising a region for temporary positioning one or more of said frames, said region being located at one end of the parking area of said frames and being provided with a plurality of said first rails with which said shuttle can align in order to load one or more chosen frames.

* * * * *